US011401913B2

(12) United States Patent
Lin et al.

(10) Patent No.: US 11,401,913 B2
(45) Date of Patent: Aug. 2, 2022

(54) YAW CALIBRATION METHOD AND SYSTEM FOR WIND TURBINE

(71) Applicants: North China Electric Power University, Beijing (CN); Guodian New Energy Technology Research Institute Co., Ltd., Beijing (CN)

(72) Inventors: Zhongwei Lin, Beijing (CN); Chenzhi Qu, Beijing (CN); Chuanxi Wang, Beijing (CN); Zhenyu Chen, Beijing (CN); Xiangyu Han, Beijing (CN); Zhen Xie, Beijing (CN); Qingru Cui, Beijing (CN); Gengda Li, Beijing (CN); Xiongwei Li, Beijing (CN)

(73) Assignees: North China Electric Power University, Beijing (CN); Guodian New Energy Technology Research Institute Co., Ltd., Beijing (CN)

( * ) Notice: Subject to any disclaimer, the term of this patent is extended or adjusted under 35 U.S.C. 154(b) by 85 days.

(21) Appl. No.: 17/095,038

(22) Filed: Nov. 11, 2020

(65) Prior Publication Data
US 2021/0148331 A1    May 20, 2021

(30) Foreign Application Priority Data
Nov. 15, 2019    (CN) .......................... 201911117633.X

(51) Int. Cl.
*F03D 7/02*    (2006.01)
*F03D 7/04*    (2006.01)

(52) U.S. Cl.
CPC ........... *F03D 7/0204* (2013.01); *F03D 7/048* (2013.01); *F05B 2270/32* (2013.01);
(Continued)

(58) Field of Classification Search
CPC .... F03D 7/0204; F03D 7/048; F05B 2270/32; F05B 2270/321
See application file for complete search history.

(56) References Cited

U.S. PATENT DOCUMENTS 8,506,247 B2 *    8/2013    Stiesdal ................ F03D 7/0204
                                                    416/61
8,899,920 B2 *    12/2014   Andersen .............. F03D 7/0204
                                                    416/61

OTHER PUBLICATIONS

"Research on Analysis Method of Wind Turbine Yaw Correction", Huadian Technology, vol. 39 No. 4, Apr. 2017, 4 pages.
(Continued)

*Primary Examiner* — Michael L Sehn
(74) *Attorney, Agent, or Firm* — Dorsey & Whitney LLP

(57) ABSTRACT

The disclosure proposes a yaw calibration method and system for a wind turbine. The calibration method includes: establishing a cylindrical coordinate graph of wind resource distribution based on historical wind farm operation data, to determine a wind direction interval of main inflow wind conditions of a wind farm; calculating an effective value of active power of each wind speed sub-interval, and obtaining a fitted power curve of each refined interval through curve fitting; and setting an angle between a central axis of a refined interval for a fitted power curve corresponding to a calibration curve in each wind speed range and a central axis of the to-be-calibrated wind direction interval as a yaw error calibration value in the wind speed range, to establish a wind speed-yaw error calibration value lookup table; and determining a yaw error calibration value under a current wind direction and a current wind.

10 Claims, 7 Drawing Sheets

(52) U.S. Cl.
CPC ... *F05B 2270/321* (2013.01); *F05B 2270/328* (2013.01); *F05B 2270/329* (2013.01); *F05B 2270/70* (2013.01)

(56) References Cited

OTHER PUBLICATIONS

Pei, et al., "Data-Driven Method for Wind Turbine Yaw Angle Sensor Zero-Point Shifting Fault Detection", Energies, 11, 553, Mar. 5, 2018, pp. 1-14.

\* cited by examiner

YAW CALIBRATION METHOD AND SYSTEM FOR WIND TURBINE

TECHNICAL FIELD

The disclosure relates to the technical field of wind farm operation control, and in particular, to a yaw calibration method and system for a wind turbine.

BACKGROUND

A yaw system is one of the most basic control loops of horizontal-axis wind turbines, and ensures that the blades always face the wind. The yaw system includes a yaw actuator and its drive control logic, and adjusts the direction of the wind turbine head by driving a yaw motor installed between the nacelle and the tower to ensure that a central axis of the nacelle is consistent with the inflow wind direction, thereby ensuring that the wind turbine has the maximum wind energy conversion efficiency. Under ideal wind alignment conditions, an angle between the direction of the wind turbine nacelle and the inflow wind direction is 0°. However, in actual practice, due to human factors such as manufacturing, installation, and debugging, the default value of zero degrees of the wind vane cannot be level with the central axis of the nacelle. As a result, the wind turbine nacelle cannot implement accurate wind alignment, which affects the power generation of the wind turbine. According to Betz's law, the wind energy capture power P of the wind turbine can be obtained as follows:

$$P = \frac{1}{2}\rho\pi R^2 C_p v^3 \cos^3(\theta)$$

If a wind direction measurement device indirectly causes a deviation $\theta$ during wind alignment, the power P will decrease to $P(1-\cos^3(\theta))$. Therefore, calibrating steady-state errors of the yaw system is essential to increase the generating capacity of the wind turbine.

SUMMARY

The disclosure is intended to provide a yaw calibration method and system for a wind turbine, so as to implement yaw error calibration and increase the generating capacity of a wind turbine.

To achieve the above purpose, the disclosure provides the following technical solutions.

A yaw calibration method for a wind turbine includes the following steps:

by taking the true north direction as the 0° direction, performing wind direction interval division by yaw offset threshold amplitude of a wind turbine in a range of 0° to 360° to obtain a plurality of wind direction intervals;

extracting historical wind farm operation data from an SCADA system of a wind farm;

based on the historical wind farm operation data, establishing a cylindrical coordinate graph of wind resource distribution with the polar coordinates of wind directions and wind speeds at the bottom, and occurrence frequencies of wind conditions on the vertical axis;

determining, based on the coordinate graph of wind resource distribution, a wind direction interval of main inflow wind conditions of the wind farm as a to-be-calibrated wind direction interval, and obtaining a set of to-be-calibrated wind direction intervals;

dividing each to-be-calibrated wind direction interval in the set of to-be-calibrated wind direction intervals into a plurality of refined intervals, and dividing each refined interval into a plurality of wind speed sub-intervals;

calculating an effective value of active power in each wind speed sub-interval;

performing curve fitting on the effective values of the active power of all wind speed sub-intervals in each refined interval to obtain a fitted power curve of each refined interval;

setting an envelope of the fitted power curves of all refined intervals in each to-be-calibrated wind direction interval as a calibration curve of each to-be-calibrated wind direction interval;

setting an angle between a central axis of a refined interval for a fitted power curve corresponding to a calibration curve in each wind speed range and a central axis of the to-be-calibrated wind direction interval as a yaw error calibration value in the wind speed range, and establishing a wind speed-yaw error calibration value lookup table of each to-be-calibrated wind direction interval;

obtaining a current wind direction and a current wind speed from the SCADA system of the wind farm; and determining a yaw error calibration value under the current wind direction and wind speed based on the current wind direction, the current wind speed, and the wind speed-yaw error calibration value lookup table of each to-be-calibrated wind direction interval, and calibrating a yaw angle of the wind turbine.

Optionally, after the determining a yaw error calibration value under the current wind direction and wind speed based on the current wind direction, the current wind speed, and the wind speed-yaw error calibration value lookup table of each to-be-calibrated wind direction interval, and calibrating a yaw angle of the wind turbine, the method further includes:

extracting discrete data points of each wind speed sub-interval in each refined interval of each to-be-calibrated wind direction interval to obtain a training data set of each wind speed sub-interval;

using an adaptive K-Means clustering algorithm to cluster the discrete data points in each training data set, determining a delay time of a discrete data point with maximum power in each wind speed sub-interval as an optimal setting value of a delay time of the wind speed sub-interval, and establishing a wind speed-wind direction-delay time optimization table; and determining an optimal setting value of a delay time of the wind turbine based on the current wind direction, the current wind speed, and the wind speed-wind direction-delay time optimization table, and setting a delay time parameter of the wind turbine.

Optionally, the calculating an effective value of active power in each wind speed sub-interval specifically includes:

collecting active power probability distribution statistics for the discrete data points in each wind speed sub-interval based on the historical wind farm operation data, and using active power with a highest occurrence frequency as the effective value of the active power in the wind speed sub-interval.

Optionally, before the establishing, based on the historical wind farm operation data, a cylindrical coordinate graph of wind resource distribution with the polar coordinates of wind directions and wind speeds at the bottom, and occurrence frequencies of wind conditions on the vertical axis, the method further includes:

cleaning the historical wind farm operation data to remove discrete points of wind turbine abnormal operation data and discrete points of invalid data in the historical wind farm operation data, and obtaining cleaned historical wind farm operation data; and preprocessing the cleaned historical wind farm operation data to remove discrete points of curtailment operating condition data, discrete points of abnormal blade pitch angle position data, and discrete points of nacelle initial position offset data in the cleaned historical wind farm operation data, and obtaining preprocessed historical wind farm operation data.

Optionally, before the establishing, based on the historical wind farm operation data, a cylindrical coordinate graph of wind resource distribution with the polar coordinates of wind directions and wind speeds at the bottom, and occurrence frequencies of wind conditions on the vertical axis, the method further includes:

calibrating the wind direction measurement data in the historical wind farm operation data based on the historical wind farm operation data and "wind direction measurement absolute value=nacelle initial position+nacelle position+wind direction measurement value".

Optionally, after the setting an angle between a central axis of a refined interval for a fitted power curve corresponding to a calibration curve in each wind speed range and a central axis of the to-be-calibrated wind direction interval as a yaw error calibration value in the wind speed range, and establishing a wind speed-yaw error calibration value lookup table of each to-be-calibrated wind direction interval, the method further including:

using a wind measurement lidar installed on the wind turbine to obtain an angle between the wind direction and the wind turbine head as an actually measured yaw error value;

looking up the wind speed-yaw error calibration value lookup table for a yaw error calibration value; and performing weighted average calculation on the actually measured yaw error value and the yaw error calibration value, and using a calculation result as a new yaw error calibration value, to calibrate and optimize the wind speed-yaw error calibration value lookup table.

A calibration system for a wind turbine yaw system includes:

a first interval division module, configured to: by taking the true north direction as the 0° direction, perform wind direction interval division by yaw offset threshold amplitude of a wind turbine in a range of 0° to 360° to obtain a plurality of wind direction intervals;

a historical wind farm operation data extraction module, configured to extract historical wind farm operation data from an SCADA system of a wind farm;

a wind resource distribution cylindrical coordinate graph establishment module, configured to: based on the historical wind farm operation data, establish a cylindrical coordinate graph of wind resource distribution with polar coordinates of wind directions and wind speeds at the bottom, and occurrence frequencies of wind conditions on the vertical axis;

a to-be-calibrated wind direction interval obtaining module, configured to determine, based on the coordinate graph of wind resource distribution, a wind direction interval of main inflow wind conditions of the wind farm as a to-be-calibrated wind direction interval, and obtain a set of to-be-calibrated wind direction intervals;

a second interval division module, configured to divide each to-be-calibrated wind direction interval in the set of to-be-calibrated wind direction intervals into a plurality of refined intervals, and divide each refined interval into a plurality of wind speed sub-intervals;

an active power effective value calculation module, configured to calculate an effective value of active power in each wind speed sub-interval;

a curve fitting module, configured to perform curve fitting on the effective values of the active power of all wind speed sub-intervals in each refined interval to obtain a fitted power curve of each refined interval;

a calibration curve obtaining module, configured to set an envelope of the fitted power curves of all refined intervals in each to-be-calibrated wind direction interval as a calibration curve of each to-be-calibrated wind direction interval;

a wind speed-yaw error calibration value lookup table establishment module, configured to set an angle between a central axis of a refined interval for a fitted power curve corresponding to a calibration curve in each wind speed range and a central axis of the to-be-calibrated wind direction interval as a yaw error calibration value in the wind speed range, and establish a wind speed-yaw error calibration value lookup table of each to-be-calibrated wind direction interval;

a current wind condition obtaining module, configured to obtain a current wind direction and a current wind speed from the SCADA system of the wind farm; and a wind turbine adjustment module, configured to determine a yaw error calibration value under the current wind direction and wind speed based on the current wind direction, the current wind speed, and the wind speed-yaw error calibration value lookup table of each to-be-calibrated wind direction interval, and calibrate a yaw angle of the wind turbine.

Optionally, the calibration system further includes:

a training data set extraction module, configured to extract discrete data points of each wind speed sub-interval in each refined interval of each to-be-calibrated wind direction interval to obtain a training data set of each wind speed sub-interval;

a clustering module, configured to use an adaptive K-Means clustering algorithm to cluster the discrete data points in each training data set, determine a delay time of a discrete data point with maximum power in each wind speed sub-interval as an optimal setting value of a delay time of the wind speed sub-interval, and establishing a wind speed-wind direction-delay time optimization table; and a parameter optimization and setting module, configured to determine an optimal setting value of a delay time of the wind turbine based on the current wind direction, the current wind speed, and the wind speed-wind direction-delay time optimization table, and setting a delay time parameter of the wind turbine.

Optionally, the active power effective value calculation module specifically includes:

an active power effective value calculation sub-module, configured to collect active power probability distribution statistics for discrete data points in each wind speed sub-interval based on the historical wind farm operation data, and use active power with a highest occurrence frequency as the effective value of the active power in the wind speed sub-interval;

Optionally, the calibration system further includes:

a data cleaning module, configured to clean the historical wind farm operation data to remove discrete points of wind turbine abnormal operation data and discrete points of invalid data in the historical wind farm operation data, and obtain cleaned historical wind farm operation data; and a data preprocessing module, configured to preprocess the cleaned historical wind farm operation data to remove discrete points of curtailment operating condition data, discrete points of abnormal blade pitch angle position data, and discrete points of nacelle initial position offset data in the cleaned historical wind farm operation data, and obtain preprocessed historical wind farm operation data.

Optionally, the calibration system further includes:

a wind direction calibration module, configured to calibrate wind direction measurement data in the historical wind farm operation data based on the historical wind farm operation data and "wind direction measurement absolute value=nacelle initial position+nacelle position+wind direction measurement value".

Optionally, the calibration system further includes:

a measurement module, configured to use a wind measurement lidar installed on the wind turbine to obtain an angle between a wind direction and a wind turbine head as an actually measured yaw error value;

a table lookup module, configured to look up the wind speed-yaw error calibration value lookup table of a yaw error calibration value; and a lookup table calibration and optimization module, configured to perform weighted average calculation on the actually measured yaw error value and the yaw error calibration value, and use a calculation result as a new yaw error calibration value to calibrate and optimize the wind speed-yaw error calibration value lookup table.

According to specific examples of the disclosure, the disclosure has the following technical effects.

The disclosure proposes a yaw calibration method and system for a wind turbine. The calibration method includes: establishing a cylindrical coordinate graph of wind resource distribution based on historical wind farm operation data, to determine a wind direction interval of main inflow wind conditions of a wind farm; calculating an effective value of active power of each wind speed sub-interval, and obtaining a fitted power curve of each refined interval through curve fitting; setting the curve as a calibration curve of each to-be-calibrated wind direction interval, and setting an angle between a central axis of a refined interval for a fitted power curve corresponding to a calibration curve in each wind speed range and a central axis of the to-be-calibrated wind direction interval as a yaw error calibration value in the wind speed range, to establish a wind speed-yaw error calibration value lookup table; and determining a yaw error calibration value under a current wind direction and a current wind speed through table lookup, and calibrating a yaw angle of a wind turbine. This realizes the yaw error calibration and increases the power generation capacity of the wind turbine.

BRIEF DESCRIPTION OF DRAWINGS

The patent or application file contains at least one drawing executed in color. Copies of this patent or patent application publication with color drawing(s) will be provided by the Office upon request and payment of the necessary fee.

In order to illustrate the examples of the disclosure or the technical solutions of the prior art, the accompanying drawing to be used will be described briefly below. Notably, the following accompanying drawing merely illustrates some examples of the disclosure, but other accompanying drawings can also be obtained those of ordinary skill in the art based on the accompanying drawing without any creative efforts.

DETAILED DESCRIPTION

The following clearly and completely describes the technical solutions in the examples of the disclosure with reference to accompanying drawings in the examples of the disclosure. Apparently, the described examples are merely a part rather than all of the examples of the disclosure. All other examples obtained by a person of ordinary skill in the art based on the examples of the disclosure without creative efforts shall fall within the protection scope of the disclosure.

The disclosure is intended to provide a yaw calibration method and system for a wind turbine, so as to implement yaw error calibration and increase the generating capacity of a wind turbine.

To make the foregoing objective, features, and advantages of the disclosure clearer and more comprehensible, the disclosure is further described in detail below with reference to the accompanying drawings and specific embodiments.

Figure 1:
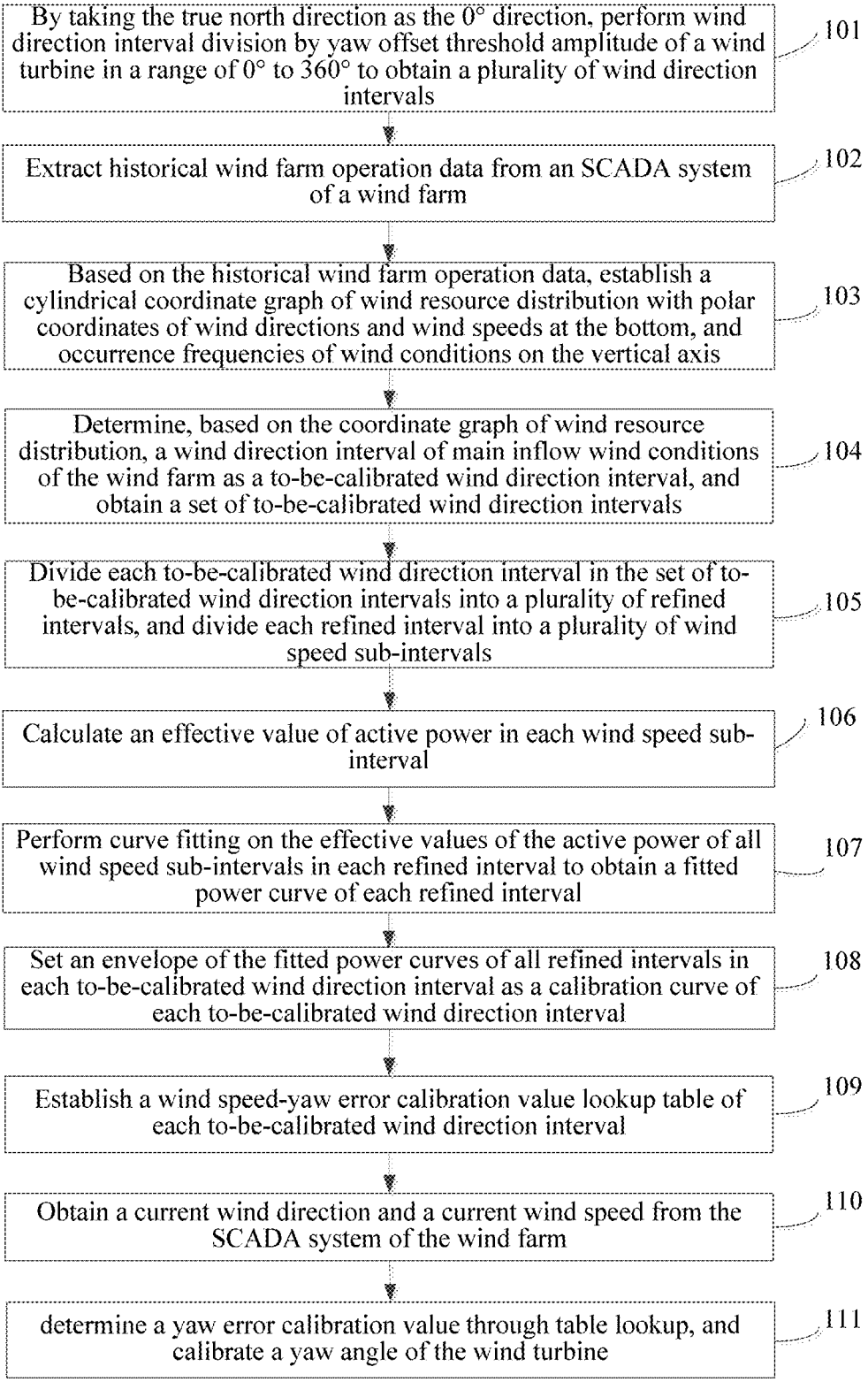
FIG. 1 is a flowchart of a yaw calibration method for a wind turbine according to the disclosure.
Figure 2:
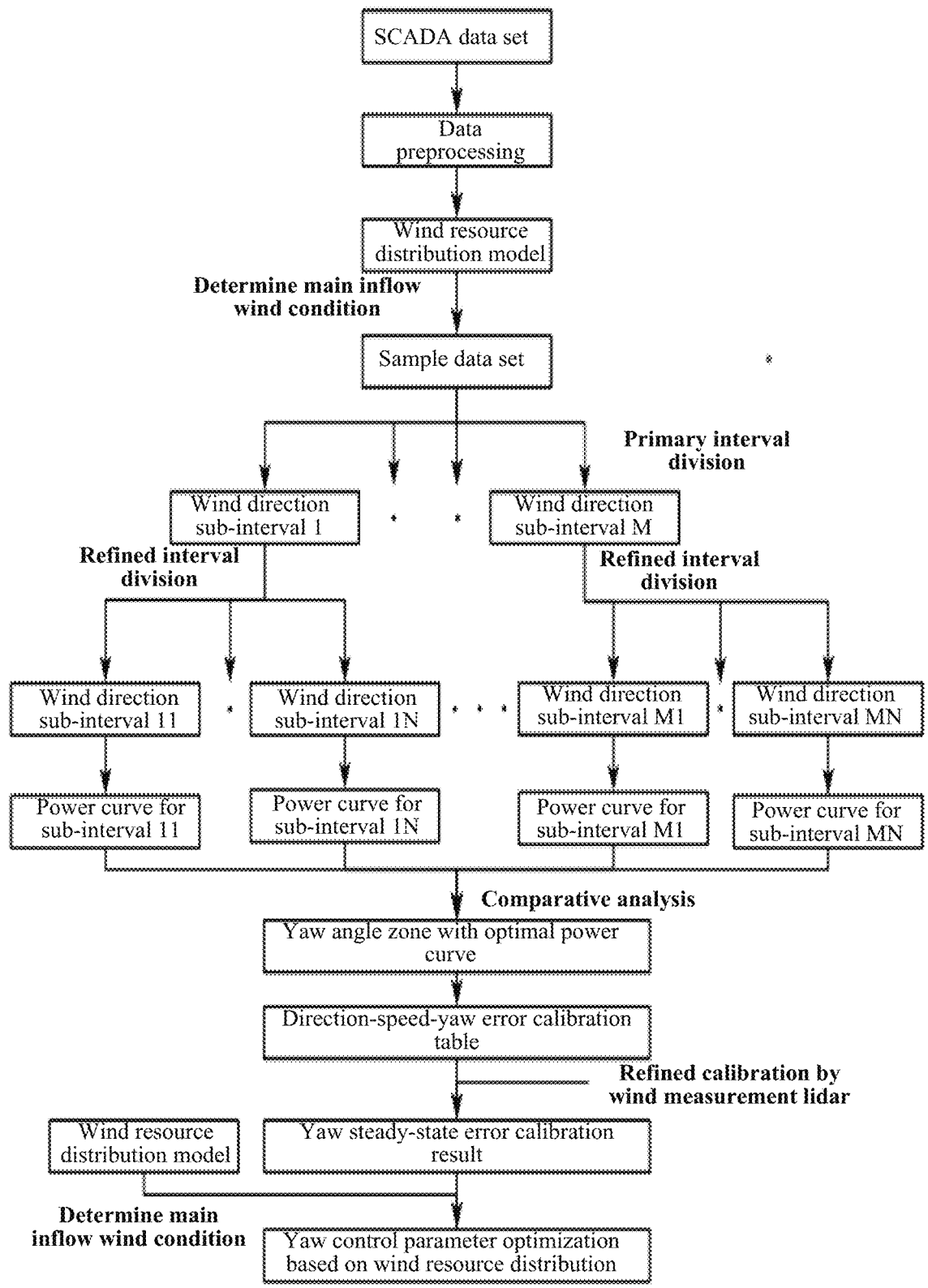
FIG. 2 is a principle diagram of a yaw calibration method for a wind turbine according to the disclosure.

To achieve the above objective, the disclosure provides a yaw calibration method for a wind turbine. As shown in FIGS. 1 and 2, the calibration method includes the following steps.

Step 101: By taking the true north direction as the 0° direction, perform wind direction interval division by yaw offset threshold amplitude of a wind turbine in a range of 0° to 360° to obtain a plurality of wind direction intervals.

Based on absolute value data of wind directions, starting from true north (0°), the 360° wind direction is divided by yaw offset threshold amplitude ($-\theta + \theta$) (for example, 352°-8°, 8°-24°, 24°-40°, and 40°-56°), and a result of interval division is marked as "wind direction interval i". A yaw offset threshold is one of the key parameters of a yaw control system and represents a threshold of an angle difference between an inflow wind and a nacelle direction when a yaw actuator of the wind turbine is activated. It is a limit standard for measuring an activation condition of the yaw actuator, and also a key control parameter for the yaw actuator to start action.

Step 102: Extract historical wind farm operation data from an SCADA system of a wind farm, specifically including:

Selecting a type of SCADA data to be extracted for the calibration method: According to requirements, it is necessary to extract from the SCADA system environmental measurement data (recording geographical environmental factors of the wind farm), such as the ambient temperature, humidity, wind speed, wind direction, and atmospheric pressure; operating status data of the wind turbine (recording data returned by sensors during wind turbine operation), such as the wind turbine hub speed, inverter active power, blade pitch angle position, wind direction data of a wind vane, and nacelle position; and initial structure parameters of the wind turbine (recording initial configuration parameters of the wind turbine), such as the rated power, rated rotor speed, rated wind speed, cut-in/cut-out wind speed of the wind turbine, initial wind direction offset value, nacelle initial offset position, and status flags of multiple wind turbine components. In other words, the historical wind farm operation data includes environmental measurement data, operating status data of the wind turbine, and initial structure parameter data of the wind turbine.

After the data type is selected, it is necessary to determine a time range covered by the data and a time scale of data extraction. Considering that the distribution of wind resources is strongly volatile and seasonally variable, the time scale of the extracted SCADA operation data is 10 seconds to 1 minute, and the time range is 1 to 2 years.

SCADA data cleaning: The historical wind farm operation data is cleaned to remove discrete points of wind turbine abnormal operation data and discrete points of invalid data in the historical wind farm operation data to obtain cleaned historical wind farm operation data. Specifically, invalid points (that is, the data type is null or wrong) in data objects are first removed. After the invalid data is removed, based on the environmental measurement data contained in the objects, data below the cut-in wind speed and above the rated wind speed and discrete data points in extreme environments are removed from the SCADA system (extreme environmental data points refer to data points with environmental characteristic data such as the atmospheric temperature, humidity, and air pressure far beyond a measurement distribution range, which are evaluated based on three standard deviations (3σ)). In addition, the abnormal operation data and invalid data of the wind turbine are removed according to the IEC 61400-12 standard by comparing the operating status data of the wind turbine with the initial structure parameters of the wind turbine.

Figure 3:
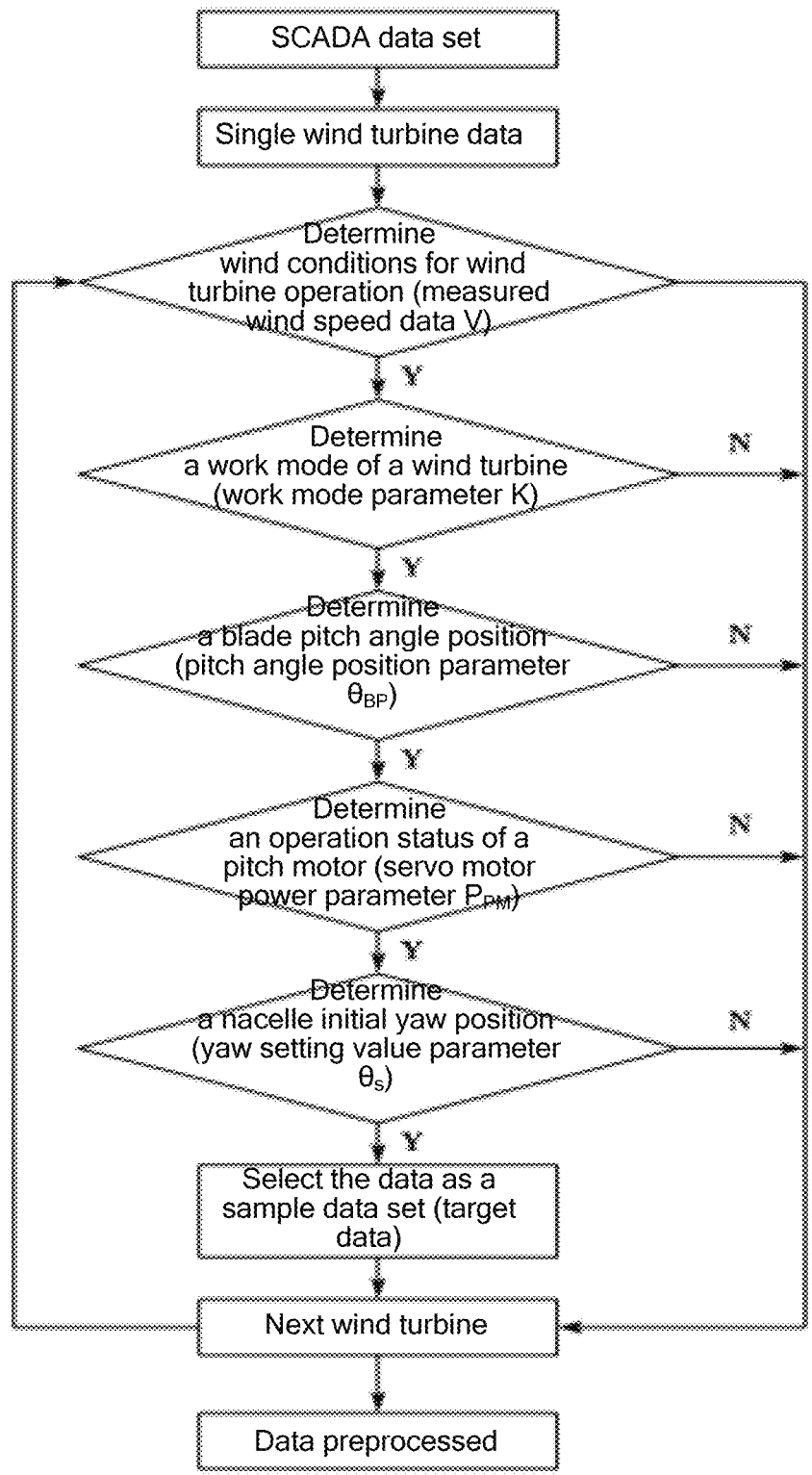
FIG. 3 is a flowchart of preprocessing cleaned historical wind farm operation data according to the disclosure.

SCADA data preprocessing: The cleaned historical wind farm operation data is preprocessed to remove discrete points of curtailment operating condition data, abnormal blade pitch angle position data, and initial nacelle position deviation data in the cleaned historical wind farm operation data, to obtain preprocessed historical wind farm operation data. Specifically, a sample data set is selected based on SCADA data such as the blade pitch angle position, pitch angle motor power, yaw angle setting value (nacelle initial offset position), and status flags, to eliminate impact of other control modes and ensure that power of the data points is only affected by the wind speed and direction. For the detailed removal process, refer to FIG. 3 and the following substeps.

1. This method only analyzes the working conditions of the wind turbine below the rated wind speed. Therefore, perform the first round of removal by comparing the rated wind speed and cut-in wind speed (initial structure parameters) recorded by the SCADA system of each wind turbine with the target "wind speed" data.

2. Remove data points related to curtailment operating conditions. Curtailment operation refers to an operating status in which a wind turbine subject to scheduling instructions of a main control unit has an actual generating power lower than the generating power of an unrestricted wind turbine under the same operating conditions. Specifically, abnormal value data points (different values represent different forms of curtailment operation) in the working mode parameters need to be removed based on the working mode parameters in the SCADA system (the set values and naming rules vary in different SCADA systems), or data points with the output power limit much lower than the rated power of the wind turbine need to be removed based on output power limit values.

3. Remove data points with abnormal blade pitch angle position values. When the wind turbine operates below the rated wind speed, the blade pitch angle position of the wind turbine is at 0° (zero initial state). Therefore, data points in a variable pitch operation state (that is, a working state when the blade pitch angle position deviates from the zero initial state) in the target data need to be removed based on the pitch angle parameter data.

4. In addition to removing the data points that are already in the variable pitch operation state in step 3, it is necessary to remove the data for variable pitch operation to prevent a blade pitch motor from dispersing the output power of the wind turbine. Therefore, remove the data points where the pitch motor is in an operating state based on power parameters of a servo motor (output power value of the pitch motor).

5. Remove data based on an initial nacelle position offset of the wind turbine. An initial nacelle position setting value of the wind turbine is a key control parameter and can be modified through a background control program. Therefore, remove data points with zero yaw offset (that is, the yaw angle setting value/nacelle initial offset position deviates from the default value) in the target data based on the yaw setting value/the nacelle initial offset position in the target data.

Calibrate the wind direction measurement data in the historical wind farm operation data based on the historical wind farm operation data and "wind direction measurement absolute value=nacelle initial position+nacelle position+wind direction measurement value". Specifically, the wind direction measurement data (where the nacelle direction data is an offset of the wind turbine head from zero degrees, and the wind direction measurement value is an offset relative to the nacelle direction) are compensated and calibrated (the calibration and compensation include: 1. incorporating all direction data in the target data into a range of 0° to 360°; 2. finding a zero-degree reference position of the wind turbine direction data based on the SCADA system or the wind turbine background control system, and performing bearing calibration on the direction data whose reference position is not true north; 3. according to real-time wind direction absolute value=nacelle initial position data+nacelle position data+wind direction measurement data of wind vane, where the nacelle initial position data is a kind of initial structural parameter of the wind turbine, and the nacelle position data and the wind direction measurement data of the wind vane are the wind turbine operating status data), obtaining the absolute value of the measured inflow wind direction with the reference value of true north and the counterclockwise direction as the positive direction.

Step 103: Based on the historical wind farm operation data, establish a cylindrical coordinate graph of wind resource distribution with polar coordinates of wind directions and wind speeds at the bottom, and occurrence frequencies of wind conditions on the vertical axis.

Perform frequency probability statistics, with the wind direction and wind speed as characteristic attributes, on the historical wind farm operation data or a direction-calibrated data set, group discrete data points in the target data by wind direction/wind speed, and count occurrence frequencies of discrete data points under different wind directions/wind speeds.

Use the wind direction, wind speed, and occurrence frequency as decision variables to draw a cylindrical coordinate graph to visualize the wind resource distribution, that is, to establish a cylindrical coordinate graph of wind resource distribution. As shown in the left figure in FIG. 5, the coordinates at the bottom are wind direction-wind speed polar coordinates, and the vertical axis shows the occurrence frequency of wind conditions, and a resulting cylindrical coordinate graph is shown in the right figure in FIG. 5. Find out the main inflow wind conditions (including the wind direction and wind speed) of the wind farm, that is, a wind direction interval with a fast wind speed and high occurrence frequency, such as the 90° direction and the 210° direction in FIG. 5.

Step 104: Determine, based on the coordinate graph of wind resource distribution, a wind direction interval of main inflow wind conditions of the wind farm as a to-be-calibrated wind direction interval, and obtain a set of to-be-calibrated wind direction intervals.

Step 105: Divide each to-be-calibrated wind direction interval in the set of to-be-calibrated wind direction intervals into a plurality of refined intervals, and divide each refined interval into a plurality of wind speed sub-intervals.

The to-be-calibrated wind direction interval is subdivided by the range of α°. This sub-interval is denoted as "refined interval". For the diagram of the two divisions of wind direction intervals, see FIG. 4. The wind direction data in the historical wind farm operation data is used as a decision variable to select discrete data points in the refined interval of the to-be-calibrated wind direction interval, and draw wind speed-power discrete points in the Cartesian coordinate system.

Collect statistics on the wind speed data of the discrete points in the Cartesian coordinate system, analyze the wind speed distribution of the discrete points to obtain a scale interval (0.1 m/s in practice) of the wind speed interval, and distinguish the discrete data points based on the wind speed scale interval, that is, classify data points based on the wind speed data by using 0.1 m/s as an interval width. For example, data points with a wind speed between 5.3 m/s and 5.4 m/s are grouped to one wind speed sub-interval.

Step 106: Calculate an effective value of active power in each wind speed sub-interval.

Step 106 of calculating an effective value of active power in each wind speed sub-interval specifically includes: collecting active power probability distribution statistics on the discrete data points in each wind speed sub-interval based on the historical wind farm operation data, and using active power with the highest occurrence frequency as the effective value of the active power for the wind speed sub-interval.

Specifically, when a width of the wind speed sub-interval is small enough, the discrete points in the wind speed sub-interval are considered as having the same wind speed. In this case, active power-based probability distribution statistics are collected for the discrete data points in each wind speed sub-interval, to obtain the occurrence times and proportion of discrete points of the same active power output values, and the active power value with the largest occurrence times/proportion is used as the effective value of the output active power of the wind turbine at the wind speed (in the wind speed sub-interval). Repeat the above steps until the calculation of effective values of active power in all wind speed sub-intervals of all refined intervals in all to-be-calibrated wind speed intervals has been completed.

Step 107: Perform curve fitting on the effective values of the active power of all wind speed sub-intervals in each refined interval to obtain a fitted power curve of each refined interval.

For two adjacent wind speed sub-intervals, draw wind power curves, with the corresponding wind speeds and effective values of the active power as the reference points. Repeat the above step until wind power curves in all adjacent intervals have been drawn. Then a quantified wind power curve of the refined interval can be obtained, that is, the fitted power curve.

Step 108: Set an envelope of the fitted power curve of all the refined intervals in each to-be-calibrated wind direction interval as a calibration curve of each to-be-calibrated wind direction interval.

Figure 4:
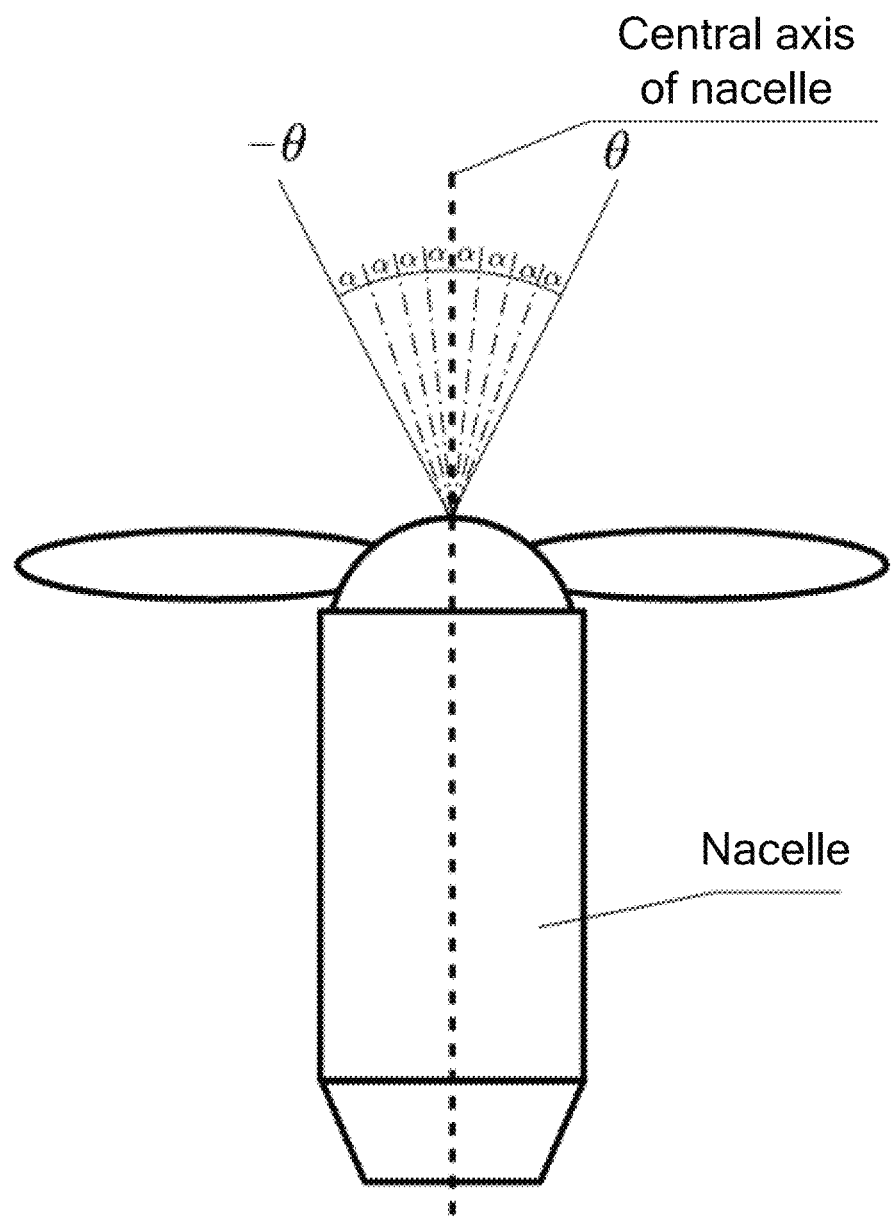
FIG. 4 is a schematic diagram of wind direction intervals according to the disclosure.

As shown in FIG. 4, the refined intervals in the to-be-calibrated wind direction interval are symmetrically distributed based on the central axis of the to-be-calibrated wind direction interval. Each refined interval represents a fixed small wind direction offset, and a specific value of the offset is an angle between the central axis of the refined interval and the central axis of the to-be-calibrated wind direction interval.

An angular offset value between the central axis of the refined interval and the central axis of the to-be-calibrated wind direction interval is used as a quantitative index for yaw steady-state error calibration, to determine a calibration value for the power curve of each refined interval, that is, an offset of the refined interval relative to the central axis of the to-be-calibrated wind direction interval is a calibration value corresponding to the refined interval, and its sign is determined by a position of the refined interval relative to the central axis of the to-be-calibrated wind direction interval (which is '+' when the refined interval is within a clockwise range, or '−' when the refined interval is within the counterclockwise range).

For each refined interval included in a to-be-calibrated wind direction interval i, perform wind power curve fitting on discrete data points in the refined interval to obtain a fitted power curve of the refined interval, and differentiate all fitted power curves of the to-be-calibrated wind direction interval i in different forms, to obtain a wind speed-power curve cluster.

For the wind speed-power curve cluster in the to-be-calibrated wind direction interval under a main wind direction, determine a refined interval corresponding to a maximum wind power curve based on maximum active power, and obtain the distribution of quantitative calibration values of a yaw steady-state error for the to-be-calibrated wind direction interval based on a position of the refined interval relative to the to-be-calibrated wind direction interval. Specifically, when the wind speed-power curve cluster shows highly consistent trends and small differences, the yaw steady-state error calibration value for the interval is zero. If the wind speed-power curve cluster shows inconsistent trends and a significant gap between the curves, perform numerical quantification to obtain the yaw steady-state error calibration value changes with the wind speed in a primary interval under the fixed wind direction based on the up and down order of the wind power curve, that is, subdivide a wind speed range, analyze a wind speed-power curve cluster in each wind speed subrange, and select an upper envelope of the wind speed-power curve cluster as the calibration curve of the to-be-calibrated wind direction interval.

Step 109: Set an angle between a central axis of a refined interval for a fitted power curve corresponding to a calibration curve in each wind speed range and a central axis of the to-be-calibrated wind direction interval as a yaw error calibration value in the wind speed range, and establish a wind speed-yaw error calibration value lookup table of each to-be-calibrated wind direction interval.

Specifically, the refined interval is inversely inferred by using the calibration curve, and an angle between the central axis of the refined interval and the central axis of the to-be-calibrated wind direction interval is obtained as the yaw error calibration value of the wind speed range, to establish the wind speed-yaw error calibration value lookup table of the to-be-calibrated wind direction interval. Based on this, a wind direction-wind speed-yaw error calibration table of the main inflow wind direction is prepared.

After step 109 of setting an angle between the central axis of a refined interval for a fitted power curve corresponding to a calibration curve in each wind speed range and the central axis of the to-be-calibrated wind direction interval as a yaw error calibration value in the wind speed range, and establishing a wind speed-yaw error calibration value lookup table of each to-be-calibrated wind direction interval, the method further includes: using a wind measurement lidar installed on the wind turbine to obtain an angle between the wind direction and the wind turbine head as an actually measured yaw error value; looking up the wind speed-yaw error calibration value lookup table for a yaw error calibration value; and performing weighted average calculation on the actually measured yaw error value and the yaw error calibration value, and using a calculation result as a new yaw error calibration value, to calibrate and optimize the wind speed-yaw error calibration value lookup table.

Specifically, the wind measurement lidar configured on the wind turbine is used to perform calibration verification on a wind speed-yaw steady-state error calibration table. The specific steps are as follows.

Install a wind measurement lidar on a nacelle of a specified wind turbine.

Make a positive direction of the wind measurement lidar parallel to the wind turbine head; under different test distances, perform measurement for the main inflow wind conditions and scenarios with large errors in the yaw steady-state error calibration table; and record wind direction angle data regularly.

Correct values in the wind speed-yaw steady-state error calibration table based on the angle between the wind direction and the wind turbine head obtained by the wind measurement lidar. For example, perform weighted average calculation on a calibration value result and a measurement result, and repeat verification test on the results with obvious deviation.

Compile a wind direction-wind speed-yaw calibration lookup table according to the actual environment of the wind farm and engineering application requirements, perform table lookup via an outboard hardware device to assist a background controller to work, provide field-oriented calibration methods, and perform calibration by adjusting a wind vane zero-degree position or an initial wind direction offset value (also known as a zero-degree wind direction compensation value).

For a wind turbine without a wind measurement lidar and related high-precision wind measurement devices, yaw steady-state errors of the wind turbine can be directly calibrated based on the wind direction-wind speed-yaw calibration lookup table.

Step 110: Obtain a current wind direction and a current wind speed from the SCADA system of the wind farm.

Step 111: Determine a yaw error calibration value under the current wind direction and wind speed based on the current wind direction, the current wind speed, and the wind speed-yaw error calibration value lookup table of each to-be-calibrated wind direction interval, and calibrate a yaw angle of the wind turbine.

Specifically, determine whether the current wind direction is in the to-be-calibrated wind direction interval for the main inflow wind direction. If yes, determine the distribution of discrete data points in a refined interval of the current wind direction based on the historical wind farm operation data of the refined interval, and determine a magnitude of the yaw steady-state error based on an aggregation degree and distribution of the discrete data points. When the distribution of the discrete data points in the refined interval is consistent with a trend of a fitted power curve of the refined interval and the discrete data points are centrally distributed, there is no obvious yaw error. When discrete data points of a refined interval are concentrated in an area and clearly separated from the discrete data points of other refined intervals, the wind turbine has obvious yaw offset in a wind direction covered by the to-be-calibrated wind direction interval, and calibration needs to be performed through table lookup.

Figure 6:
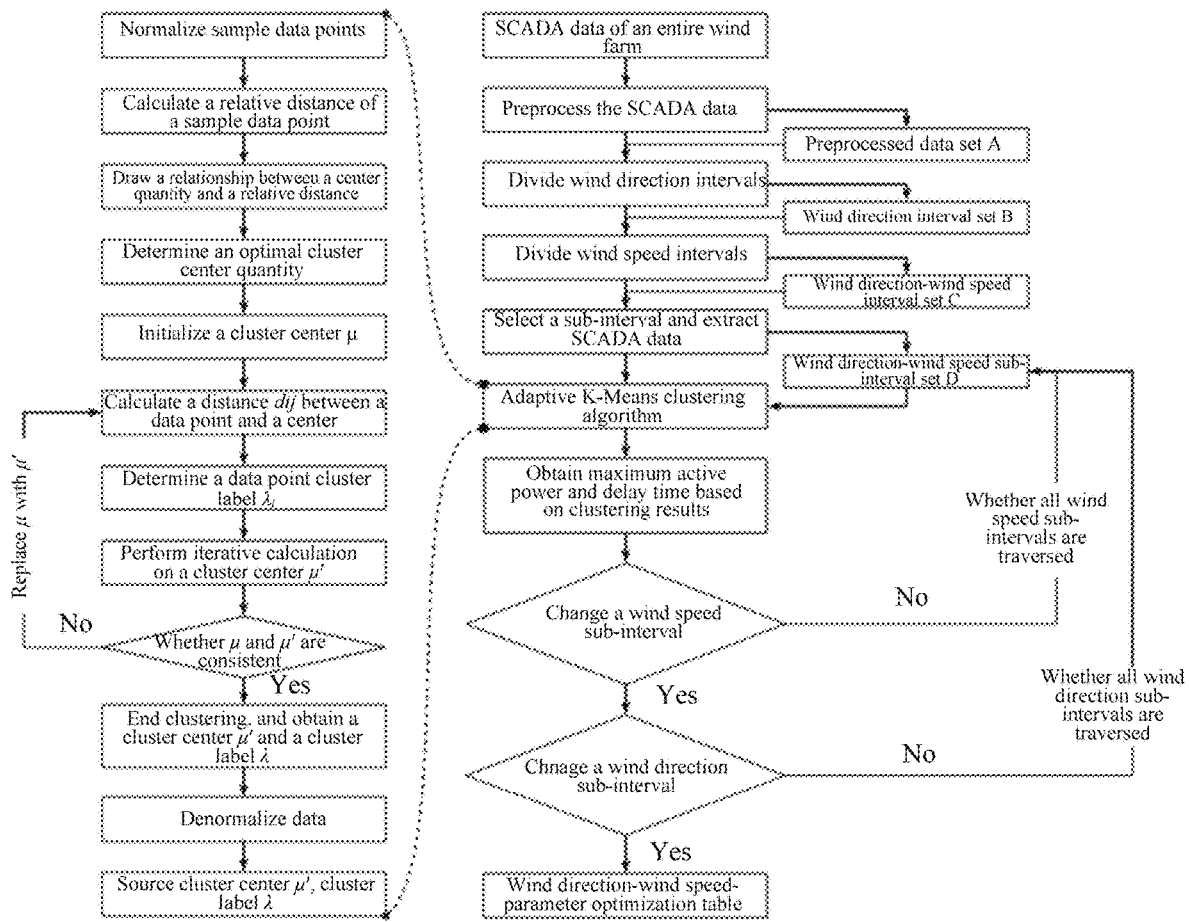
FIG. 6 is a flowchart of an adaptive K-Means clustering algorithm according to the disclosure.

After step 111 of determining a yaw error calibration value under the current wind direction and wind speed based on the current wind direction, the current wind speed, and the wind speed-yaw error calibration value lookup table of each to-be-calibrated wind direction interval, and calibrating a yaw angle of the wind turbine, the method further includes: controlling and optimizing a yaw delay time based on the wind resource distribution. As shown in FIG. 6, the specific step is as follows.

Extract discrete data points of each wind speed sub-interval in each refined interval of each to-be-calibrated wind direction interval to obtain a training data set of each wind speed sub-interval. Specifically: 1.1. To improve the efficiency of the wind turbine yaw control system, optimize control parameters of the wind turbine yaw control system after the yaw steady-state errors are calibrated. First, extract the operating data of all wind turbines in the wind farm from the SCADA system according to step 102, to form a data set for subsequent calculation. (The data used in steps 101 to 111 all comes from the SCADA system of one wind turbine, while the data used in this step comes from all data sources in the wind form) 1.2. Taking the data obtained in step 1.1 as an object, perform data preprocessing on the object to obtain a data object A. 1.3. Taking the object A as a processing object, visualize the wind resources of the wind farm in step 103, to obtain the visualized distribution of the wind resources of the wind farm, and determine the main inflow wind direction of the entire wind farm. 1.4. Taking the object A as a processing object, divide the SCADA data set A of all wind turbines in the entire wind farm by wind direction according to steps 104 and 105, and obtain a data set B with wind direction interval labels (that is, information types representing a primary interval/refined interval of data sample points). 1.5. Taking the data set B obtained in step 1.4 as a processing object, divide intervals based on wind speed information. With regard to the wind speed data in the data set B, divide all data sample points in the data set B by using 0.2 m/s as the scale interval, where a quantity N of divided intervals meets a mathematical relationship in the following formula:

$$N = \left\lceil \frac{V_{max} - V_{min}}{0.2} \right\rceil$$

$V_{max}$ and $V_{min}$ represent a maximum value and a minimum value of the wind speed data types in the data set B respectively, $\lceil \cdot \rceil$ represents a round-up function, and N represents a total quantity of the obtained wind speed intervals. 1.6. After obtaining the wind speed intervals in step 1.5, add a new data type, wind speed interval, to the data set B to indicate a wind speed sub-interval where the data sample points are located (for example, mark the data sample points with a wind speed in the range of 0 to 0.2 m/s as "wind speed interval 1"). Then, record the changed data set as a data set C. 1.7. Extract all data sample points in the same primary interval, refined interval, and wind speed sub-interval (for example, a primary interval i, a refined interval j, and a wind speed sub-interval k) in the data set C as a new data set D, and mark a quantity of sample data points in the data set D as $N_D$.

Use an adaptive K-Means clustering algorithm to cluster the discrete data points in each training data set, determine a delay time of a discrete data point with maximum power in each wind speed sub-interval as an optimal setting value of a delay time of the wind speed sub-interval, and establish a wind speed-wind direction-delay time optimization table. Specifically, run the adaptive K-Means clustering algorithm, with the delay time (initial structural parameter of the wind turbine) and active power (operating status data of the wind turbine) in the data set D as characteristic variables. The specific steps are as follows.

Step 2.1: Normalize the delay time and active power of the data sample points in the data set D according to the following formula:

$$x'_i = \frac{x_i - x_{min}}{x_{max} - x_{min}}$$

$x_i$ is feature data of the $i^{th}$ sample point in the data set D, and represents a feature data vector combining a delay time and active power of the $i^{th}$ sample point, $x_{min}$ and $x_{max}$ represent vectors composed of minimum values and maximum values of the feature data (delay time and active power) of the sample points in the data set D, and a normalized feature data set is denoted as D*.

Step 2.2: Determine a quantity of clusters of the adaptive K-Means clustering algorithm, and substitute the normalized feature data as objects into the following relative distance function for calculation:

$$E = \frac{\sum_{0<i<j<N_D} \|x_i - x_j\|_2^2}{N_{cluster}}$$

Figure 5:
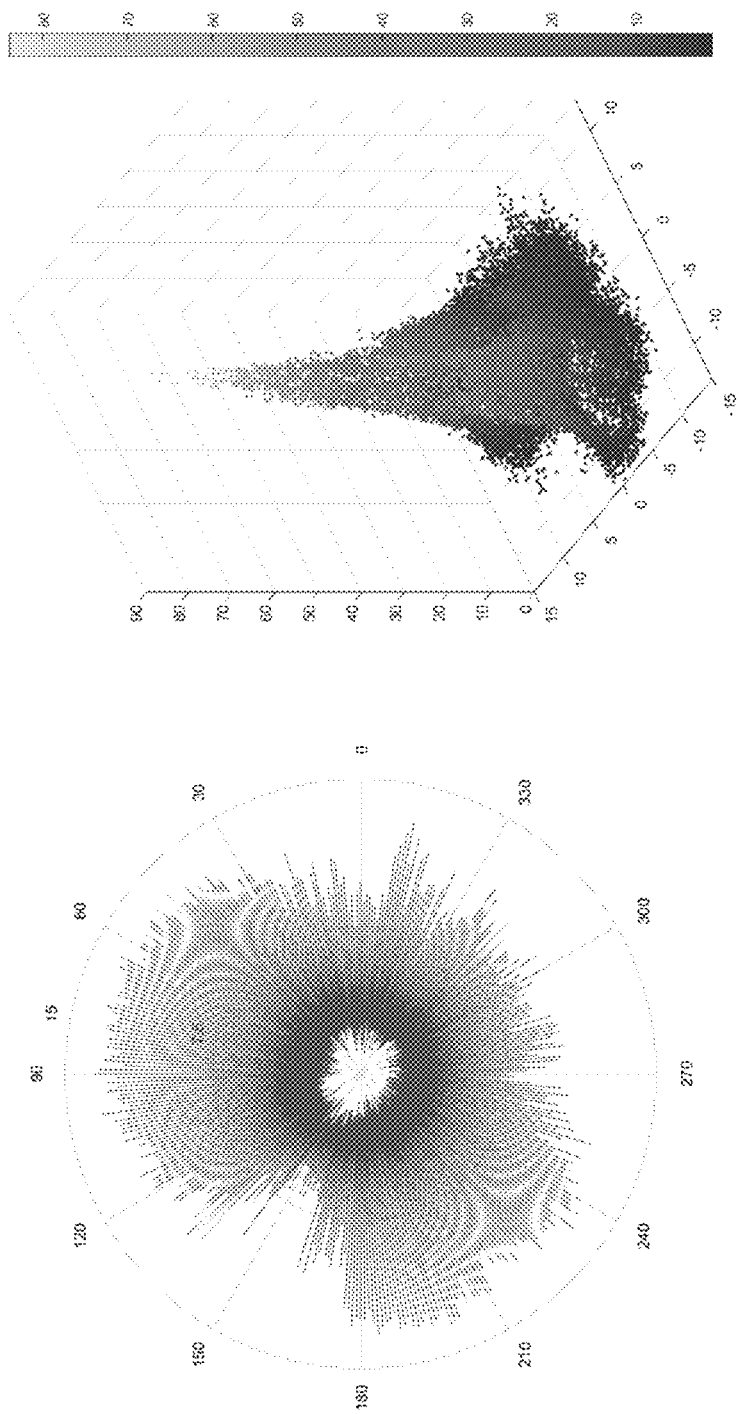
FIG. 5 is a schematic diagram of a cylindrical coordinate graph of wind resource distribution according to the disclosure.

E represents a calculated value of the relative distance function, $N_{cluster}$ represents a quantity of to-be-selected clusters, $N_D$ represents the quantity of sample data points, and $\|\cdot\|_2^2$ represents a 2-norm function. Gradually increase $N_{cluster}$ from 2, to obtain the E values corresponding to different $N_{cluster}$ values, and draw an E-$N_{cluster}$ transformation curve (as shown in FIG. 5). Based on the curve change, use the $N_{cluster}$ value at the curve inflection point as an optimal cluster quantity of the clustering algorithm this time, which is denoted as $M_D$.

Step 2.3: Execute the K-Means clustering algorithm, to randomly extract feature data of $M_D$ sample points from the sample data set D* as an initial clustering center. $\mu = \{\mu_1, \mu_2, \ldots, \mu_{M_D}\}$ Step 2.4: Calculate a distance $d_{ij}$ between feature data $x_i$ of a sample points in the sample data set D* and the cluster center $\mu$. The calculation function is as follows:

$$d_{ij} = \|x_i - \mu_j\|_2^2$$

$x_i$ represents feature data of the $i^{th}$ sample point, $\mu_{ij}$ represents the $j^{th}$ cluster center, $\|\cdot\|_2^2$ represents a 2-norm function, and $d_{ij}$ represents a distance between the feature data $x_i$ and the cluster center $\mu_j$.

Step 2.5: Determine a cluster label of a cluster center corresponding to a sample point according to a logical relationship in the following formula:

$$\lambda_i = \mathrm{argmin}_{i \in \{1,2,3,\ldots,M_D\}} d_{ji}$$

argmin {•} is a function for calculating a minimum value, which returns a label $\lambda_i$ (data points with the same label are in the same cluster) of a cluster center vector $\mu_i$ corresponding to a minimum distance value for different data points, and samples are grouped into a corresponding cluster $C_{\lambda_i}$, where $\lambda j=1, 2, 3 \ldots, M_D$. Repeat steps 2.4 and 2.5 until cluster labels of all the data sample points in the sample data set D* are determined.

Step 2.6: Based on the clustering result obtained in step 2.5, perform iterative calculation on a cluster center of a cluster according to the following formula:

$$\mu'_i = \frac{\sum_{x_i \in C_j} x_i}{|C_j|}$$

$C_j$ represents the $j^{th}$ cluster, $x_i$ is a feature data vector of the sample data points in the cluster, and $|C_j|$ represents the sum of distances between the data points in the cluster. Repeat this step until all clusters have completed the iterative calculation on the cluster centers.

Step 2.7: Integrate the new cluster center $\mu_i'$ calculated in step 2.6 to obtain a new cluster center $\mu' = \{\mu_1', \mu_2', \ldots, \mu_{M_D}'\}$, and update the current cluster center $\mu$ to $\mu'$.

Step 2.8: Repeat the calculations in step 2.4 to step 2.7 until the cluster center does not change, and then stop the clustering calculation and output clustering results, including cluster labels of the data set D* and a cluster center $\mu^* = \{\mu_1^*, \mu_2^*, \ldots, \mu_{M_D}^*\}$.

Step 2.9: Perform denormalization calculation on the cluster center $\mu^*$ according to the following equation:

$$x_i = x_i'^*(x_{max} - x_{min}) + x_{min}$$

$x_i'$ represents to-be-processed feature data, $x_i$ represents denormalized feature data, and $x_{min}$ and $x_{max}$ respectively represent vectors of the minimum values and the maximum values of the feature data of the sample points in the original data set D. The denormalized cluster center is denoted as $\mu^\circ = \{\mu_1^\circ, \mu_2^\circ, \ldots, \mu_{M_D}^\circ\}$.

After executing the adaptive K-Means clustering algorithm, find a center with the largest active power value from the cluster center $\mu^\circ$, so as to obtain an optimal setting value of the delay time under the maximum power, thereby obtaining an optimal control parameter value for the conditions (the primary interval i, the refined interval j, and the wind speed sub-interval k specified in step 8.7) corresponding to the data set D.

While keeping the primary interval i and the refined interval j unchanged, change the wind speed sub-interval k successively, and repeat the calculation in the preceding steps until all the wind speed sub-intervals are traversed, to obtain a wind speed-parameter optimization table with the primary interval i and the refined interval j unchanged.

While keeping the primary interval i unchanged, change the refined interval j, and repeat the calculation in the preceding steps until all the refined intervals are traversed, to obtain a refined interval-wind speed-parameter optimization table with the primary interval i unchanged.

Determine an optimal setting value of a delay time of the wind turbine based on the current wind direction, the current wind speed, and the wind speed-wind direction-delay time optimization table, and set a delay time parameter of the wind turbine. Specifically, based on the main inflow wind direction of the wind farm obtained in step 1.4, change the primary interval i within its coverage to obtain a to-be-calibrated wind direction interval, so as to obtain a wind direction-wind speed-parameter optimization table of the main inflow wind of the wind farm and optimize the control parameters (delay time) of the wind turbine yaw system.

Figure 7:
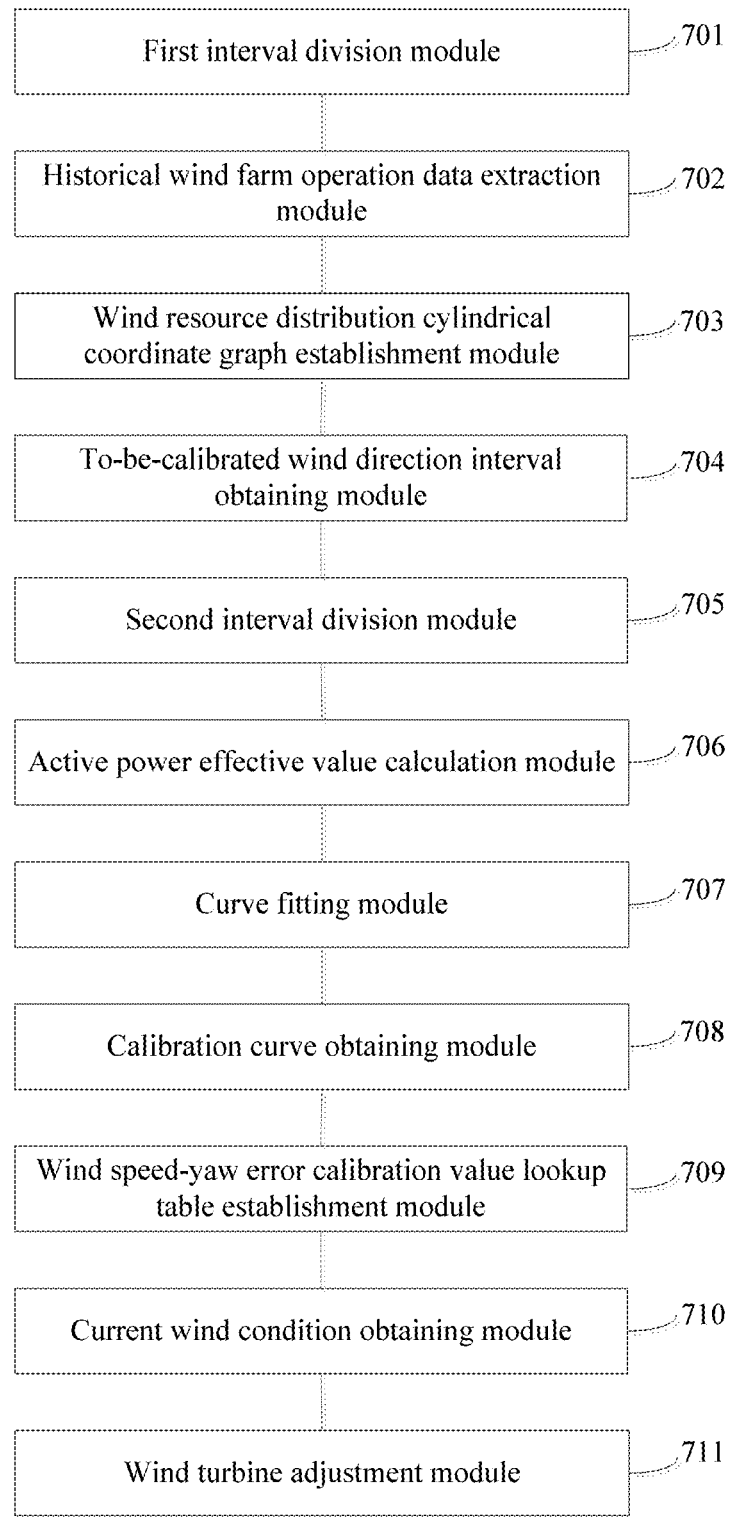
FIG. 7 is a structural diagram of a yaw calibration system for a wind turbine according to the disclosure.

As shown in FIG. 7, the disclosure further provides a calibration system for a wind turbine yaw system. The calibration system includes:

a first interval division module 701, configured to: by taking the true north direction as the 0° direction, perform wind direction interval division by yaw offset threshold amplitude of a wind turbine in a range of 0° to 360° to obtain a plurality of wind direction intervals;

a historical wind farm operation data extraction module 702, configured to extract historical wind farm operation data from an SCADA system of a wind farm;

a wind resource distribution cylindrical coordinate graph establishment module 703, configured to: based on the historical wind farm operation data, establish a cylindrical coordinate graph of wind resource distribution with the polar coordinates of wind directions and wind speeds at the bottom, and the occurrence frequency of wind conditions on the vertical axis;

a to-be-calibrated wind direction interval obtaining module 704, configured to determine, based on the coordinate graph of wind resource distribution, a wind direction interval of main inflow wind conditions of the wind farm as a to-be-calibrated wind direction interval, and obtain a set of to-be-calibrated wind direction intervals;

a second interval division module 705, configured to divide each to-be-calibrated wind direction interval in the set of to-be-calibrated wind direction intervals into a plurality of refined intervals, and divide each refined interval into a plurality of wind speed sub-intervals;

an active power effective value calculation module 706, configured to calculate an effective value of active power in each wind speed sub-interval, where the active power effective value calculation module 706 specifically includes:

an active power effective value calculation sub-module, configured to collect active power probability distribution statistics for discrete data points in each wind speed sub-interval based on the historical wind farm operation data, and use active power with a highest occurrence frequency as the effective value of the active power in the wind speed sub-interval;

a curve fitting module 707, configured to perform curve fitting on the effective values of the active power of all wind speed sub-intervals in each refined interval to obtain a fitted power curve of each refined interval;

a calibration curve obtaining module 708, configured to set an envelope of the fitted power curves of all refined intervals in each to-be-calibrated wind direction interval as a calibration curve of each to-be-calibrated wind direction interval;

a wind speed-yaw error calibration value lookup table establishment module 709, configured to set an angle between a central axis of a refined interval for a fitted power curve corresponding to a calibration curve in each wind speed range and a central axis of the to-be-calibrated wind direction interval as a yaw error calibration value in the wind speed range, and establish a wind speed-yaw error calibration value lookup table of each to-be-calibrated wind direction interval;

a current wind condition obtaining module 710, configured to obtain a current wind direction and a current wind speed from the SCADA system of the wind farm; and a wind turbine adjustment module 711, configured to determine a yaw error calibration value under the current wind direction and wind speed based on the current wind direction, the current wind speed, and the wind speed-yaw error calibration value lookup table of each to-be-calibrated wind direction interval, and calibrate a yaw angle of the wind turbine.

In a preferred implementation, the calibration system further includes: a training data set extraction module, configured to extract discrete data points of each wind speed sub-interval in each refined interval of each to-be-calibrated wind direction interval to obtain a training data set of each wind speed sub-interval; a clustering module, configured to use an adaptive K-Means clustering algorithm to cluster the discrete data points in each training data set, determine a delay time of a discrete data point with maximum power in each wind speed sub-interval as an optimal setting value of the delay time for the wind speed sub-interval, and establish a wind speed-wind direction-delay time optimization table is established; and a parameter optimization and setting module, configured to determine an optimal setting value of a delay time of the wind turbine of the wind farm based on the current wind direction, the current wind speed, and the wind speed-wind direction-delay time optimization table, and set a delay time parameter of the wind turbine.

In a preferred implementation, the calibration system further includes: a data cleaning module, configured to clean the historical wind farm operation data to remove discrete points of wind turbine abnormal operation data and discrete points of invalid data in the historical wind farm operation data, and obtain cleaned historical wind farm operation data; and a preprocessing module, configured to preprocess the cleaned historical wind farm operation data to remove discrete points of curtailment operating condition data, discrete points of abnormal blade pitch angle position data, and discrete points of nacelle initial position offset data in the cleaned historical wind farm operation data, and obtain preprocessed historical wind farm operation data.

In another preferred implementation, the calibration system further includes: a wind direction calibration module, configured to calibrate wind direction measurement data in the historical wind farm operation data based on the historical wind farm operation data and "wind direction measurement absolute value=nacelle initial position+nacelle position+wind direction measurement value".

In another preferred implementation, the calibration system further includes: a measurement module, configured to use a wind measurement lidar installed on the wind turbine to obtain an angle between a wind direction and a wind turbine head as an actually measured yaw error value; a table lookup module, configured to look up the wind speed-yaw error calibration value lookup table of a yaw error calibration value; and a lookup table calibration and optimization module, configured to perform weighted average calculation on the actually measured yaw error value and the yaw error calibration value, and use a calculation result as a new yaw error calibration value to calibrate and optimize the wind speed-yaw error calibration value lookup table.

According to specific examples of the disclosure, the disclosure has the following technical effects.

The disclosure proposes a yaw calibration method for a wind turbine. The calibration method includes: establishing a cylindrical coordinate graph of wind resource distribution based on historical wind farm operation data, to determine a wind direction interval of main inflow wind conditions of a wind farm; calculating an effective value of active power of each wind speed sub-interval, and obtaining a fitted power curve of each refined interval through curve fitting; setting the curve as a calibration curve of each to-be-calibrated wind direction interval, and setting an angle between a central axis of a refined interval for a fitted power curve corresponding to a calibration curve in each wind speed range and a central axis of the to-be-calibrated wind direction interval as a yaw error calibration value in the wind speed range, to establish a wind speed-yaw error calibration value lookup table; and determining a yaw error calibration value under a current wind direction and a current wind speed through table lookup, and calibrating a yaw angle of a wind turbine. This realizes the yaw error calibration and increases the power generation capacity of the wind turbine.

Each equivalent example of the present specification is described in a progressive manner, each example focuses on the difference from other examples, and the same and similar parts between the equivalent examples may refer to each other. Since the system disclosed in the embodiment corresponds to the method disclosed in the embodiment, the description is relatively simple. For relevant information, reference is made to the description of the method.

The principles and implementations of the disclosure have been described with reference to specific examples. The description of the above examples is only for facilitating understanding of the method and the core idea of the disclosure, and the described examples are only a part of the examples of the disclosure. All other examples obtained by a person of ordinary skill in the art based on the examples of the disclosure without departing from the inventive scope are the scope of the disclosure.

What is claimed is:

1. A yaw calibration method for a wind turbine, the yaw calibration method comprising:
    by taking the true north direction as the 0° direction, performing wind direction interval division by yaw offset threshold amplitude of a wind turbine in a range of 0° to 360° to obtain a plurality of wind direction intervals;
    extracting historical wind farm operation data from an SCADA system of a wind farm;
    based on the historical wind farm operation data, establishing a cylindrical coordinate graph of wind resource distribution with the polar coordinates of wind directions and wind speeds at the bottom, and occurrence frequencies of wind conditions on the vertical axis;
    determining, based on the coordinate graph of wind resource distribution, a wind direction interval of main inflow wind conditions of the wind farm as a to-be-calibrated wind direction interval, and obtaining a set of to-be-calibrated wind direction intervals;
    dividing each to-be-calibrated wind direction interval in the set of to-be-calibrated wind direction intervals into a plurality of refined intervals, and dividing each refined interval into a plurality of wind speed sub-intervals;
    calculating an effective value of active power in each wind speed sub-interval;
    performing curve fitting on the effective values of the active power of all wind speed sub-intervals in each refined interval to obtain a fitted power curve of each refined interval;
    setting an envelope of the fitted power curves of all refined intervals in each to-be-calibrated wind direction interval as a calibration curve of each to-be-calibrated wind direction interval;
    setting an angle between a central axis of a refined interval for a fitted power curve corresponding to a calibration curve in each wind speed range and a central axis of the to-be-calibrated wind direction interval as a yaw error calibration value in the wind speed range, and establishing a wind speed-yaw error calibration value lookup table of each to-be-calibrated wind direction interval;
    obtaining a current wind direction and a current wind speed from the SCADA system of the wind farm; and
    determining a yaw error calibration value under the current wind direction and wind speed based on the current wind direction, the current wind speed, and the wind speed-yaw error calibration value lookup table of each to-be-calibrated wind direction interval, and calibrating a yaw angle of the wind turbine.

2. The yaw calibration method according to claim 1, wherein after the determining a yaw error calibration value under the current wind direction and wind speed based on the current wind direction, the current wind speed, and the wind speed-yaw error calibration value lookup table of each to-be-calibrated wind direction interval, and calibrating a yaw angle of the wind turbine, the method further comprising:
    extracting discrete data points of each wind speed sub-interval in each refined interval of each to-be-calibrated wind direction interval to obtain a training data set of each wind speed sub-interval;
    using an adaptive K-Means clustering algorithm to cluster the discrete data points in each training data set, determining a delay time of a discrete data point with maximum power in each wind speed sub-interval as an optimal setting value of a delay time of the wind speed sub-interval, and establishing a wind speed-wind direction-delay time optimization table; and
    determining an optimal setting value of a delay time of the wind turbine based on the current wind direction, the current wind speed, and the wind speed-wind direction-delay time optimization table, and setting a delay time parameter of the wind turbine.

3. The yaw calibration method according to claim 1, wherein the calculating an effective value of active power in each wind speed sub-interval specifically comprises:
    collecting active power probability distribution statistics for the discrete data points in each wind speed sub-interval based on the historical wind farm operation data, and using active power with a highest occurrence frequency as the effective value of the active power in the wind speed sub-interval.

4. The yaw calibration method according to claim 1, wherein before the establishing, based on the historical wind farm operation data, a cylindrical coordinate graph of wind resource distribution with the polar coordinates of wind directions and wind speeds at the bottom, and occurrence frequencies of wind conditions on the vertical axis, the method further comprises:
    cleaning the historical wind farm operation data to remove discrete points of wind turbine abnormal operation data and discrete points of invalid data in the historical wind farm operation data, and obtaining cleaned historical wind farm operation data; and preprocessing the cleaned historical wind farm operation data to remove discrete points of curtailment operating condition data, discrete points of abnormal blade pitch angle position data, and discrete points of nacelle initial position offset data in the cleaned historical wind farm operation data, and obtaining preprocessed historical wind farm operation data.

5. The yaw calibration method according to claim 1, wherein before the establishing, based on the historical wind farm operation data, a cylindrical coordinate graph of wind resource distribution with the polar coordinates of wind directions and wind speeds at the bottom, and occurrence frequencies of wind conditions on the vertical axis, the method further comprises:

calibrating the wind direction measurement data in the historical wind farm operation data based on the historical wind farm operation data and "wind direction measurement absolute value=nacelle initial position+ nacelle position+wind direction measurement value".

6. The yaw calibration method according to claim 1, wherein after the setting an angle between a central axis of a refined interval for a fitted power curve corresponding to a calibration curve in each wind speed range and a central axis of the to-be-calibrated wind direction interval as a yaw error calibration value in the wind speed range, and establishing a wind speed-yaw error calibration value lookup table of each to-be-calibrated wind direction interval, the method further comprising:

using a wind measurement lidar installed on the wind turbine to obtain an angle between the wind direction and the wind turbine head as an actually measured yaw error value;

looking up the wind speed-yaw error calibration value lookup table for a yaw error calibration value; and performing weighted average calculation on the actually measured yaw error value and the yaw error calibration value, and using a calculation result as a new yaw error calibration value, to calibrate and optimize the wind speed-yaw error calibration value lookup table.

7. A calibration system for a wind turbine yaw system, the calibration system comprising:

a first interval division module, configured to: by taking the true north direction as the 0° direction, perform wind direction interval division by yaw offset threshold amplitude of a wind turbine in a range of 0° to 360° to obtain a plurality of wind direction intervals;

a historical wind farm operation data extraction module, configured to extract historical wind farm operation data from an SCADA system of a wind farm;

a wind resource distribution cylindrical coordinate graph establishment module, configured to: based on the historical wind farm operation data, establish a cylindrical coordinate graph of wind resource distribution with polar coordinates of wind directions and wind speeds at the bottom, and occurrence frequencies of wind conditions on the vertical axis;

a to-be-calibrated wind direction interval obtaining module, configured to determine, based on the coordinate graph of wind resource distribution, a wind direction interval of main inflow wind conditions of the wind farm as a to-be-calibrated wind direction interval, and obtain a set of to-be-calibrated wind direction intervals;

a second interval division module, configured to divide each to-be-calibrated wind direction interval in the set of to-be-calibrated wind direction intervals into a plurality of refined intervals, and divide each refined interval into a plurality of wind speed sub-intervals;

an active power effective value calculation module, configured to calculate an effective value of active power in each wind speed sub-interval;

a curve fitting module, configured to perform curve fitting on the effective values of the active power of all wind speed sub-intervals in each refined interval to obtain a fitted power curve of each refined interval;

a calibration curve obtaining module, configured to set an envelope of the fitted power curves of all refined intervals in each to-be-calibrated wind direction interval as a calibration curve of each to-be-calibrated wind direction interval;

a wind speed-yaw error calibration value lookup table establishment module, configured to set an angle between a central axis of a refined interval for a fitted power curve corresponding to a calibration curve in each wind speed range and a central axis of the to-be-calibrated wind direction interval as a yaw error calibration value in the wind speed range, and establish a wind speed-yaw error calibration value lookup table of each to-be-calibrated wind direction interval;

a current wind condition obtaining module, configured to obtain a current wind direction and a current wind speed from the SCADA system of the wind farm; and a wind turbine adjustment module, configured to determine a yaw error calibration value under the current wind direction and wind speed based on the current wind direction, the current wind speed, and the wind speed-yaw error calibration value lookup table of each to-be-calibrated wind direction interval, and calibrate a yaw angle of the wind turbine.

8. The calibration system according to claim 7, further comprising:

a training data set extraction module, configured to extract discrete data points of each wind speed sub-interval in each refined interval of each to-be-calibrated wind direction interval to obtain a training data set of each wind speed sub-interval;

a clustering module, configured to use an adaptive K-Means clustering algorithm to cluster the discrete data points in each training data set, determine a delay time of a discrete data point with maximum power in each wind speed sub-interval as an optimal setting value of a delay time of the wind speed sub-interval, and establishing a wind speed-wind direction-delay time optimization table; and a parameter optimization and setting module, configured to determine an optimal setting value of a delay time of the wind turbine based on the current wind direction, the current wind speed, and the wind speed-wind direction-delay time optimization table, and setting a delay time parameter of the wind turbine.

9. The calibration system according to claim 7, wherein the active power effective value calculation module specifically comprises:

an active power effective value calculation sub-module, configured to collect active power probability distribution statistics for discrete data points in each wind speed sub-interval based on the historical wind farm operation data, and use active power with a highest occurrence frequency as the effective value of the active power in the wind speed sub-interval.

10. The calibration system according to claim 7, wherein the calibration system further comprises:

a data cleaning module, configured to clean the historical wind farm operation data to remove discrete points of wind turbine abnormal operation data and discrete points of invalid data in the historical wind farm operation data, and obtain cleaned historical wind farm operation data; and a data preprocessing module, configured to preprocess the cleaned historical wind farm operation data to remove discrete points of curtailment operating condition data, discrete points of abnormal blade pitch angle position data, and discrete points of nacelle initial position offset data in the cleaned historical wind farm operation data, and obtain preprocessed historical wind farm operation data.

\* \* \* \* \*